3,520,776
ASSEMBLY OF FUEL ELEMENTS FOR NUCLEAR REACTORS
Jean Claude Charrault, François Lafontaine, and Serge Orlowski, Ispra, Italy, assignors to European Atomic Energy Community-Euratom, Brussels, Belgium
Continuation of application Ser. No. 385,194, July 27, 1964. This application Aug. 11, 1966, Ser. No. 571,945
Claims priority, application Belgium, Oct. 3, 1963, 511,545
Int. Cl. G21c *15/00, 19/28*
U.S. Cl. 176—51                               3 Claims

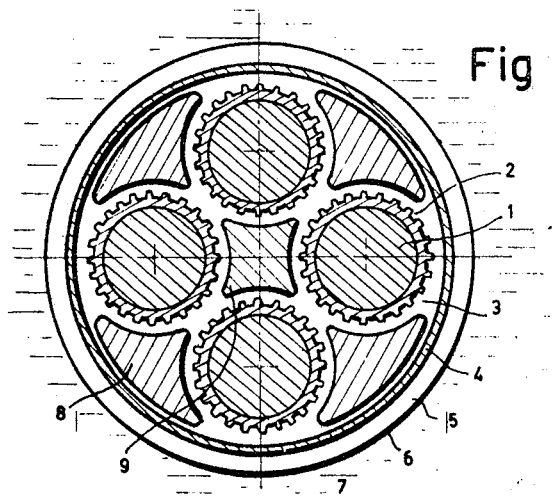
Fig 1 PRIOR ART
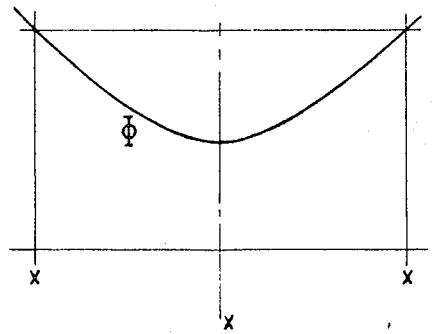
Fig 2 PRIOR ART
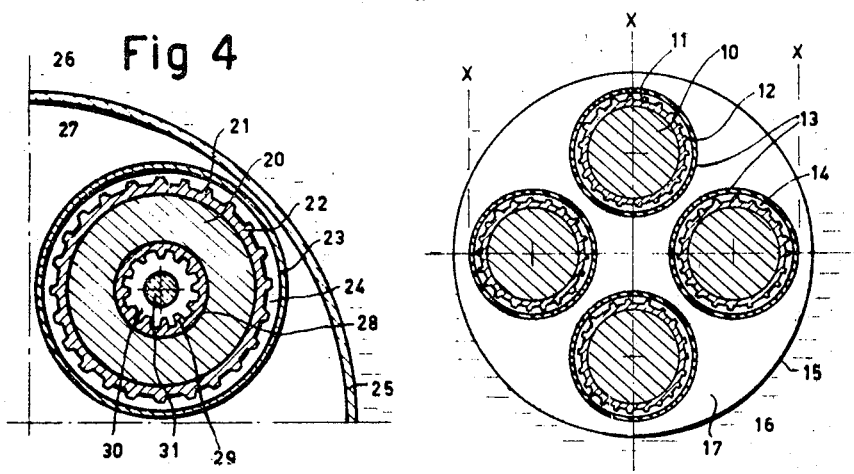
Fig 4
Fig 3
INVENTORS
Jean Claude CHARRAULT
Francois LAFONTAINE
Serge ORLOWSKI
BY
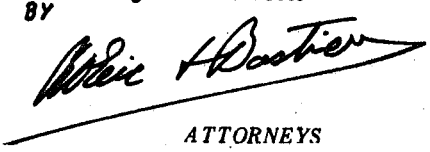
ATTORNEYS United States Patent Office 3,520,776
Patented July 14, 1970

ABSTRACT OF THE DISCLOSURE

A pressure tube assembly for nuclear reactor. Instead of having a plurality of fuel pencils or rods enclosed within a single pressure tube as in the prior art, each pencil or rod is enclosed within its own pressure tube. The assembly is thereafter mounted within a calandria as in the prior art. The rods are preferably sheathed with a low absorption metal formed with small heat-exchange fins. A heat-carrying fluid flows inside each pressure tube and around the rod. A thermal insulating gas is contained inside the calandria. The calandria is immersed in a moderator. In a preferred embodiment, each rod is hollowed out and sheathed internally with a low absorbing metal having fins. A heat-carrying fluid flows inside the hole of the rod.

---

This application is a continuation of copending application Ser. No. 385,194, filed July 27, 1964, now abandoned.

The instant invention relates to an assembly of fuel elements for nuclear reactors of the type which comprises pressure tubes, that is, tubes enclosing fuel elements and within which a heat-carrying fluid is made to flow under pressure.

It is known that thermal neutron nuclear reactors comprise a mass of moderator material through which channels containing fuel elements are provided. In the case of a liquid moderator such as water or heavy water, these channels are constituted by resisting tubes, metallic or otherwise.

These tubes have two essential functions: on the one hand, they must contain the fuel elements and provide for the circulation of the gaseous or liquid cooling fluid, and, on the other hand provide a thermal barrier between the fuel elements and the heat carrying fluid which are hot, for instance 400° C., and the moderator which must remain at a reasonable temperature, for instance lower than 80° C. in the case of heavy water, to avoid boiling.

In known reactors, these two functions are filled by two concentric tubes separated by a suitable insulating layer (gas, liquid or solid). A conventional arrangement resides in mounting the pressure tube on the inside and a tube called "calandria tube" on the outside, that is dipped in the moderator.

From a thermal point of view, it has already been demonstrated that dividing of the nuclear fuel in several small rods or pencils assembled in clusters inwardly of each channel was better than a single cylindrical more massive rod.

An object of the instant invention is to obviate certain disadvantages of such known assemblies and to improve the neutronic economy thereof, therefore the overall energy of the nuclear reactors in which they are used.

An assembly of fuel elements for nuclear reactors according to the invention is essentially characterized in that each fuel slender rod or pencil is surrounded by an individual pressure tube over the full length of the active part or heart of the reactor, each channel of the reactor being jacketed by a calandria tube which contains a thermal insulating fluid in which are immersed several of these slender rods provided with individual pressure tubes, the heat carrying fluid flowing inside each individual pressure tube.

It is to be understood that the words "slender rods" or "pencils" as used above designated one or several cylinders or prims made of fissile material arranged in the continuation of one another and, particularly, a succession or stack of pellets having a small height in relation to their cross section.

According to a further embodiment of the invention, each slender rod comprises a central sheathed bore, inside of which there may be provided either a filler made of material having little absorbing power in order to adjust the internal flow cross-section thereof, or a fertile material which is converted into fissile material under the action of neutronic bombardments.

Two embodiments of the invention will now be described, as non-limitative examples, with reference to the appended drawings wherein:

FIG. 1 is a cross-sectional view through a known nuclear reactor channel in which is mounted a cluster of four slender rods;

FIG. 2 is a graph illustrating the variation in neutron flux $\phi$ across the nuclear reactor channel;

FIG. 3 is a schematic transverse cross-sectional view of a channel of a pressure tube reactor provided with a fuel tube assembling according to the invention;

FIG. 4 is a (partial) transverse cross-sectional view of a channel of a pressure tube reactor provided with a fuel tube assembling similar to that of FIG. 3 but where the fuel pencils comprise a central sheathed hole.

FIG. 1, which shows a cross-section of a nuclear reactor channel, illustrates four pencils or slender rods 1 made of fissile material and distributed around the central longitudinal axis of the channel, each rod being sheathed with a low absorption metal tube such as aluminum or zirconium; a heat carrying fluid 3 such as carbonic gas or an organic liquid; a pressure tube 4; an insulating layer 5; a calandria tube 6 and the moderator 7.

In the curve of FIG. 2, which illustrates the variation of the neutronic flux $\phi$ through this cross-section, it can be seen that the flux is a maximum in the thickness of the pressure tube which, in practice, is sufficiently thick to resist the pressure and, consequently, capable of substantially absorbing neutrons. In fact, this maximum value of the flux is about twice that of the minimum value at the center of the channel, along the longitudinal axis thereof.

Finally, essentially for hydrodynamic and thermodynamic reasons but also for neutronic reasons, the spaces created between the fuel elements inside the pressure tube are generally partially filled by such parts as 8 and 9 made of materials having a low absorbing power such as graphite and beryllium and having such outer profiles as to cause the formation of suitable flow paths for the heat carrying fluid.

The embodiments of the invention which are improvements over the fuel reactor channel of FIG. 1 are illustrated in FIGS. 3 and 4.

In FIG. 3, one has represented the section of only one channel of a pressure tube reactor. This type of reactor is well known, for instance from British Pat. 754,183 (A.S.E.A.); it comprises several parallel tubes disposed in spaced relation and extending through a moderator tank. Such a channel is referenced 15, 16 being the liquid neutron moderator (e.g. heavy water). Inside this channel, are four fuel pencils 10 made of fissile material and sheathed with a metal 11 of low absorbing power such as aluminum or zirconium and formed with small heat-exchange fins 12. According to the invention, each pencil is surrounded by a pressure tube 13 capable of resisting the pressure of the heat carrying fluid 14 which flows around the said pencil 10. Pressure tube 13 may be made of sintered aluminum-aluminum oxide or any other known suitable material. The four pressure tubes 13 are distributed according to a geometry of revolution in the channel proper, the latter being constituted by a calandria tube 15 immersed in a moderator 16, such as heavy water, and which contains an atmosphere of a thermal insulating gas 17, such as nitrogen.

From the curve of FIG. 2 which illustrates the variation of the neutron flux along a diameter of the cross-section represented on FIG. 1, it can be seen that the flux is minimum at the axis of the reactor channel and maximum at its periphery. In fact, this maximum value of the flux is about twice that of the minimum value at the center of the channel. This underlines an important advantage of the invention: in known fuel assemblies, the pressure tube is coaxial just inside the calandria tube 15; thus, the pressure tube which is thick to be able to withstand the coolant fluid pressure, is very much a neutron absorbing as it is in the area of maximum neutron flux. On the contrary, according to the invention, only very small parts of individual pressure tubes 13 (which are thinner) are in this area: this brings a valuable neutron economy.

In FIG. 4, the elements are the same as above but numbered 20 to 27 rather than 10 to 17. However, each pencil 20 is hollowed out and sheathed internally with a suitable metal 28 also having fins 29. Inwardly of each hole flows a heat carrying fluid within which may be provided a filler 31 having a cross-section calculated according to the hydrodynamic and thermal conditions of the element under consideration, that is, a rod made of fertile material which is a body capable of conversion into fissile material under the action of neutronic bombardments.

The table given hereinbelow illustrates, for two optimized reactors using the same gross electric power (250 mw.), the advantages derived from the use of assemblies of fuel elements according to the invention. These reactors are of the heavy water moderated type cooled by an organic liquid; each channel contains four fuel pencils in a single pressure tube in the first case and four individual pressure tubes in the second case.

|  | Conventional pressure tube | Individual pressure tubes |
|---|---|---|
| Gross electric power (mw.) | 250 | 250 |
| Fuel cost (mills/kw.h.) | 1.11 | 0.85 |
| Cost of electrical energy | 3.95 | 3.63 |
| Direct investments=dollar cost of the plant and of the first load of fuel ($10⁶) | 48.91 | 47.62 |
| Combustion rate=burn-up (mw.J./.t): |  |  |
| Central zone | 8,100 | 8,700 |
| Outer zone | 6,000 | 6,600 |
| Fuel cross-section, per channel (cm²) | 35 | 35 |
| Diameter of the pressure tube (cm.) | 1×(9.49–9.89) | 4×(3.98–4.18) |
| Diameter of the calender tube (cm.) | 10.49–10.79 | 11.05–11.35 |
| Cross-section of the beryllium and graphite fillings, per channel (cm.²) | 18.9 | 0 |
| Speed of the organic liquid (m./s.) | 8 | 8 |
| Outlet temperature of the liquid (°C.) | 400 | 400 |
| Inlet pressure of the liquid (kg./cm.²) | 15 | 18 |

The cost of the electric energy is calculated on the total sum of the fixed expenditures, due to the direct investment and the fuel cost.

The advantages of the invention are clearly apparent and are substantial.

First of all, the quantity of material necessary to produce individual pressure tubes for the pencils or slender rods of a channel is smaller than the quantity necessary to produce a single pressure tube surrounding all of the slender rods, as in conventional reactors: this is an economy on the quantity of unnecessary material and a reduction in neutron absorption.

On the other hand, the individual pressure tubes in each channel are, as an average, in less important neutronic flux zones and consequently their neutronic absorption is reduced.

Finally, filling of the channels, around the slender rods, being omitted and replaced by an insulating gaseous medium, a double economy is again obtained: on the one hand, on material since the known fillings are costly as to production (particularly in the case of beryllium) and as to machining and, on the other hand, in regard to neutron absorption since a gas such as nitrogen has a much lower absorption power than filling materials, even less than the best filling materials such as graphite or beryllium.

It is to be understood that the invention is not to be limited to the specific embodiments just described but should, to the contrary, embrace any variants thereof; thus, for instance, the geometry of the cross-section would be other than revolution or comprise a different number of slender rods or else contain slender rods or individual pressure tubes of dimensions different between them.

We claim:
1. In a nuclear reactor having an active portion or heart and provided with at least one channel within which are mounted a plurality of fuel rods, the combination comprising:
 (a) a pressure tube for and surrounding each single rod in spaced relationship therewith, said tubes extending on the full length of the heart of said reactor;
 (b) a calandria tube defining said channel and within which said pressure tubes are mounted with the corresponding rods thereof; the said pressure tubes being mounted in spaced relationship with said calandria tube;
 (c) a thermal insulating fluid within said calandria tube and in which said pressure tubes and the corresponding rods thereof are immersed, and
 (d) a heat-carrying fluid between each pressure tube and the corresponding fuel rod.

2. Fuel element pressure tube assembly for a nuclear reactor having at least one channel within which are mounted a plurality of fuel rods, said fuel element pressure tube assembly comprising a calandria tube mounted in said nuclear reactor to define a reactor channel, a plurality of pressure tubes mounted within said calandria tube in spaced relationship therewith, each of said pressure tube being intended for and surrounding each single fuel rod in spaced relationship therewith, said pressure tube extending on the full length of the core of said reactor, heat-carrying fluid flowing inside of each said pressure tube between said pressure tube and the corresponding fuel rod and a thermal insulating fluid lying within said calandria tubes around said pressure tubes.

3. Fuel element pressure tube assembly for a nuclear reactor having at least one channel within which are mounted a pluriaity of fuel rods, said fuel element pressure tube assembly comprising a thin calandria tube mounted in said nuclear reactor to define a reactor channel, said assembly comprising a plurality of individual pressure tubes mounted within said calandria tube in spaced relationship therewith, each of said pressure tubes surrounding each single fuel rod in spaced relationship therewith, said pressure tubes extending on the whole length of the core of said reactor, heat-carrying fluid flowing inside of each said pressure tube between said pressure tube and the corresponding fuel rod and a thermal insulating fluid lying within said calandria tube around said pressure tubes.

References Cited

UNITED STATES PATENTS 3,071,527   1/1963   Young   176—52
3,190,807   6/1965   Bevilacqua   176—64

FOREIGN PATENTS 754,183   8/1956   Great Britain.

CARL D. QUARFORTH, Primary Examiner

H. E. BEHREND, Assistant Examiner

U.S. Cl. X.R.

176—52, 59, 64, 81